US005950427A

United States Patent [19]

Demerjian, Jr. et al.

[11] Patent Number: 5,950,427

[45] Date of Patent: Sep. 14, 1999

[54] FAIL-SAFE ELECTRIC HYDRAULIC ACTUATOR

[75] Inventors: Paul D. Demerjian, Jr., Holden; Douglas A. Robbie, Bellingham; Steven P. Bernard, Shrewsbury, all of Mass.

[73] Assignee: Worcester Controls Licensco, Inc., Wilmington, Del.

[21] Appl. No.: 08/972,443

[22] Filed: Nov. 18, 1997

[51] Int. Cl.[6] ............................ F16D 31/02; F01B 7/02; F01B 31/00

[52] U.S. Cl. ................................ 60/404; 60/406; 91/440; 92/69 R; 92/163; 92/138; 92/130 A

[58] Field of Search ............................ 60/406, 432, 404; 91/436, 440, 437, 173; 92/136, 138, 130 R, 130 A, 130 B, 130 D, 68, 69 R, 75, 165 PR, 163, 164

[56] References Cited

U.S. PATENT DOCUMENTS

| | | | |
|---|---|---|---|
| 837,252 | 11/1906 | Rose | 92/164 X |
| 2,134,227 | 10/1938 | Forkardt | 92/163 X |
| 2,534,525 | 12/1950 | Molloy | 91/440 X |
| 2,844,127 | 7/1958 | Steiner | 92/68 |
| 3,411,409 | 11/1968 | Bunyard | 92/130 R X |
| 3,456,561 | 7/1969 | Laikam, Jr. | 91/440 |
| 3,572,032 | 3/1971 | Terry | 60/404 X |
| 3,982,725 | 9/1976 | Clark | 92/69 R X |
| 4,054,155 | 10/1977 | Hill | 60/432 X |
| 4,065,094 | 12/1977 | Adams . | |
| 4,087,073 | 5/1978 | Runberg et al. | 91/440 X |
| 4,132,071 | 1/1979 | Priese et al. . | |
| 4,203,351 | 5/1980 | Schwind | 92/69 R |
| 4,354,424 | 10/1982 | Nordlund | 92/130 D X |
| 4,647,003 | 3/1987 | Hilpert et al. | 92/69 R X |
| 4,757,684 | 7/1988 | Wright | 60/404 |
| 4,770,264 | 9/1988 | Wright et al. | 92/130 D X |
| 4,905,574 | 3/1990 | Trevisan | 92/130 D X |
| 5,139,106 | 8/1992 | Elser et al. | 91/437 X |
| 5,440,969 | 8/1995 | Shin | 92/68 |
| 5,615,595 | 4/1997 | Davis | 91/440 |

*Primary Examiner*—John E. Ryznic
*Attorney, Agent, or Firm*—Pollock, Vande Sande & Amernick

[57] ABSTRACT

An electro-hydraulic valve actuator comprising an actuator casing; a piston/rack means in the casing having walls reciprocating linearly to effect linear movements, the reciprocating walls defining a center chamber therebetween and two outside chambers inside the casing; an output shaft in communication with the piston/rack means for driving a valve, the output shaft effecting rotational movements in response to the linear movements of the piston/rack means; resilient return means in each of the two outside chambers engaging the reciprocating walls of the piston/rack means and inner end walls of the casing, the resilient return means biasing the reciprocating walls of the piston/rack means to a closed position; a pumping means; a primary internal flow path for transferring hydraulic fluid from the pumping means to a first output port and into the center chamber, the hydraulic fluid in the center chamber causing the piston/rack means to expand in the casing to transmit the linear movements to the output shaft; and a fail-safe solenoid valve system having a secondary internal flow path connecting to and extending from the primary internal flow path to a second outlet port opening into at least one of the outside chambers, and a normally closed solenoid valve in the secondary flow path preventing flow through the secondary internal flow path. Upon loss of power to the actuator, the fail-safe solenoid valve opens to thereby cause the resilient return means to force hydraulic fluid out of the center chamber, through the primary and secondary internal flow paths, into at least one of the outside chambers, so that the piston/rack means is returned to a closed position for rotating the output shaft to drive the valve.

11 Claims, 6 Drawing Sheets

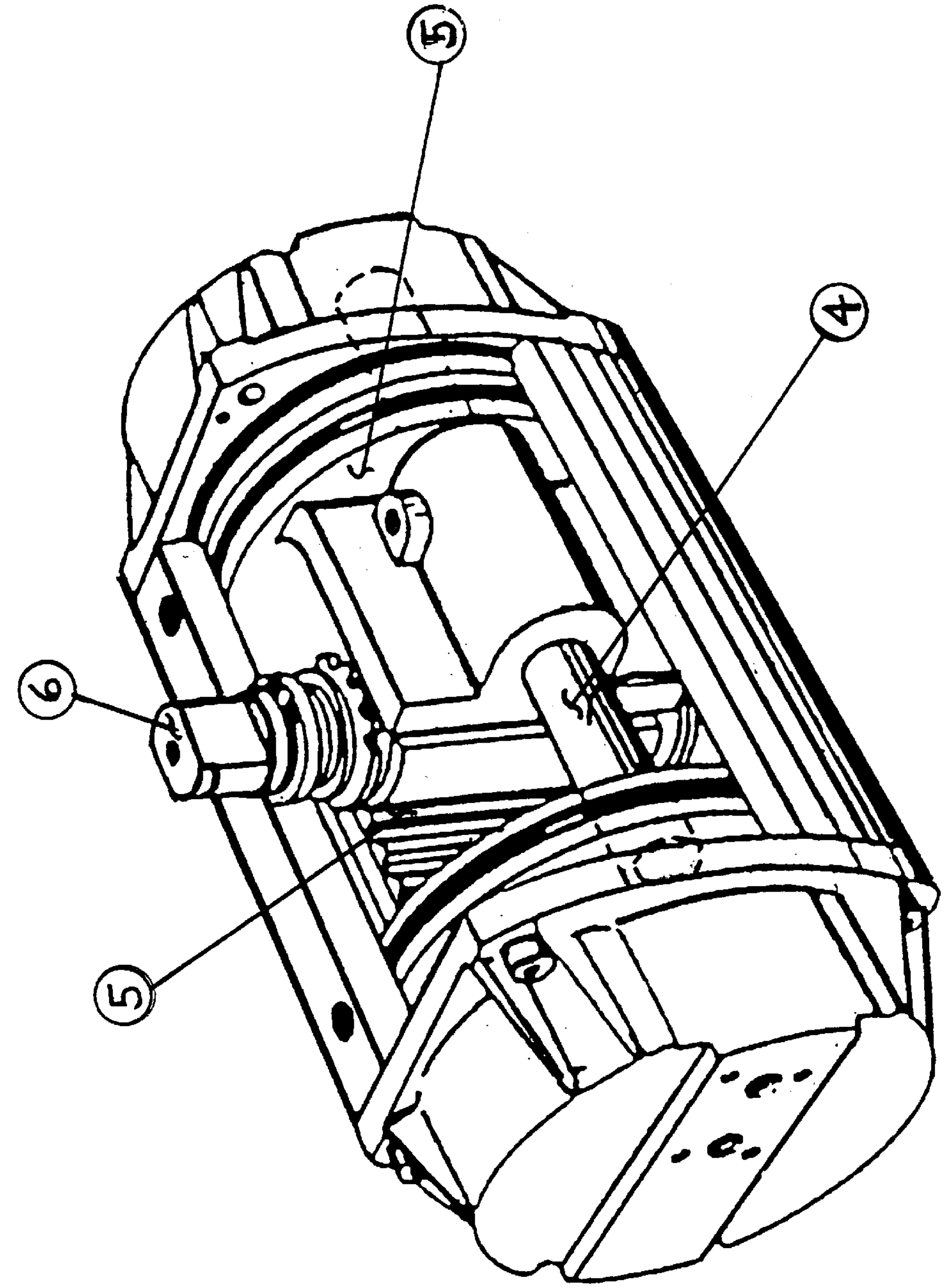
FIGURE 2A - PRESSURIZED

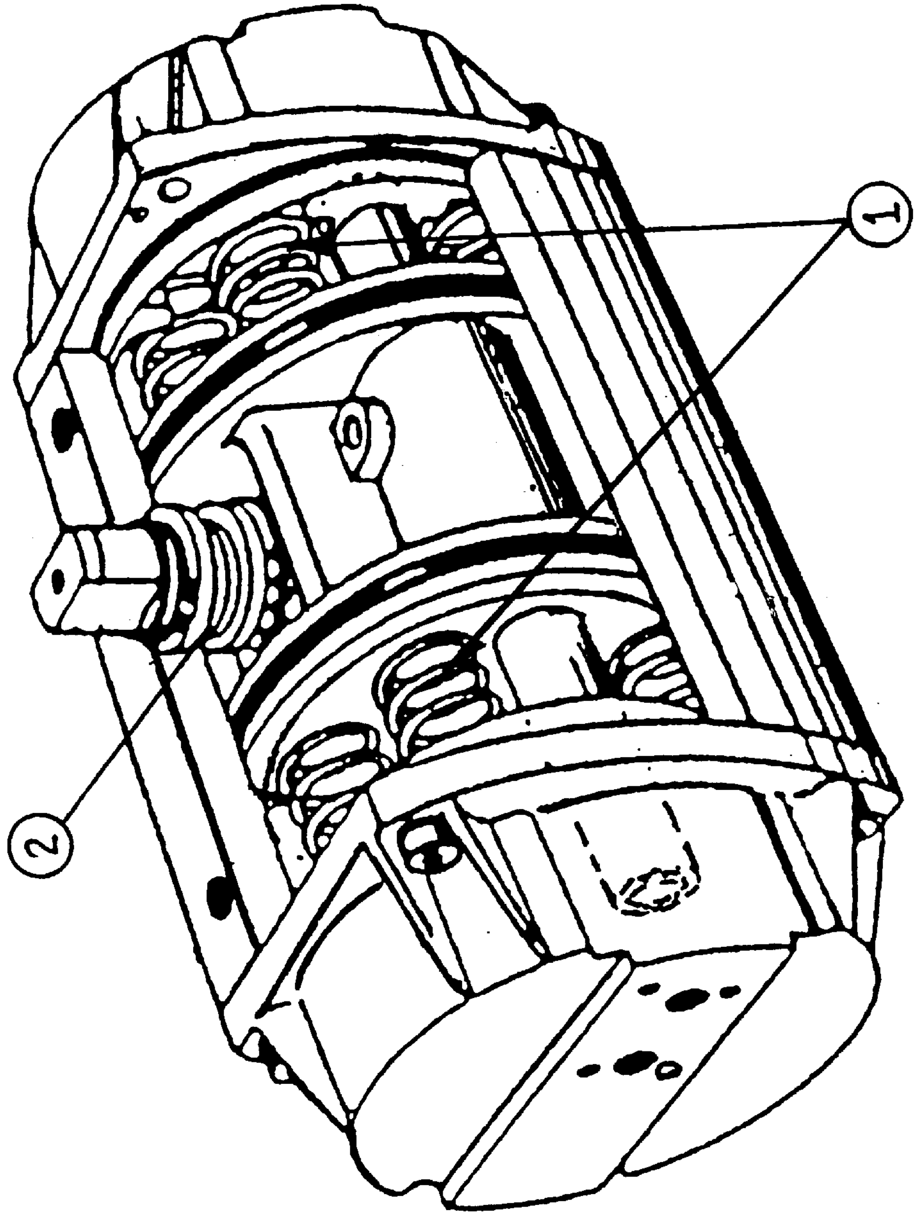
FIGURE 2B - UNPRESSURIZED

FAIL-SAFE ELECTRIC HYDRAULIC ACTUATOR

FIELD OF THE INVENTION

This invention relates generally to fail-safe valve actuators.

BACKGROUND OF THE INVENTION

It is desirable for electrically operated valves in operating facilities in chemical, petrochemical and power industries to be provided with fail-safe mechanisms to open or close upon loss of electrical power or instrument control signal at the actuator. In various types of piping systems in these facilities, it is even essential to have valves fail in a "safe" position for safety, to avoid system damage, or to avoid loss of chemicals. For example, in many systems, hazardous chemicals must be contained or controlled, or reactions must be prevented or stopped, in the event of system failure. There are many types of fail-safe valve systems known in the art, such as electro-pneumatic, electro-hydraulic and electromechanical systems.

One type of electromechanical system known in the art comprises an electric valve actuator and a spring return mechanism. This actuator uses a motor and gearbox to actuate a valve and to wind up a spring which reverses upon loss of electrical signal or power to the actuator. The actuator can operate to hold the spring in the open position continuously or to actuate the spring with every turn. Actuators which energize the spring during every actuation have a disadvantage of increasing the power requirements to run the actuator motor to twice that required to run a motor of an actuator not having a fail-safe mechanism. If the spring is instead continuously held in the energized position, it is not exercised until it is called upon to actuate the valve, thus, increasing the likelihood of sticking components and actuator malfunction.

Alternatively, electric valve actuators use a battery backup to reverse actuator direction when a loss of power is detected at the actuator. However, batteries will only actuate the valve a limited number of times depending on the storage potential of the battery and the power requirements of the actuator. Failure to maintain the battery charged and in good working order will negate the fail-safe feature of the actuator.

A third way of providing fail-safe mechanisms for electrically actuated valves is to use a spring return arrangement whereby fluid is pumped into a chamber by a hydraulic pump driven by an electric motor. The fluid moves a piston(s) and rotates the output shaft, while compressing and energizing the return spring(s). An electrically controlled solenoid valve maintains the pressure developed in the chamber. Upon loss of power or electrical signal, the solenoid valve is opened which allows the spring(s) to return the fluid from the pressurized chamber to the nonpressurized reservoir.

Examples of prior art electro-hydraulic valve actuators with spring returns are disclosed in U.S. Pat. No. 4,132,071, U.K. patent 2,005772 and Canadian patent 2,202,821. These electro-hydraulic actuators operate in similar manners whereby hydraulic fluid is pumped into a chamber which moves a piston against a spring. Release of the pressure allows the spring to return the piston and move the fluid from the pressurized center to the un-pressurized endcap or spring housing.

Prior art electro-hydraulic actuators such as those mentioned above have several disadvantages, including: 1) using scotch yoke and spur gear systems with a piston rod for changing linear motion in the actuator to rotary output motion, thus limiting rotary motion to a maximum of 90 degree; 2) using external conduits which are susceptible to freezing, breakage and leakage; 3) using external cylinders to house fail safe springs, thus requiring rod spring guide systems to insure linear compression of the spring without distortion; and 4 using only one solenoid valve for both fail-safe operation and position controlling.

SUMMARY OF THE INVENTION

It is an object of the invention to provide an electro-hydraulic actuator having no external components susceptible to damage from freezing, leakage and breaking. Specifically, it is an object to provide (a) an actuator having completely internal flow paths for fluid movement with no external connections to transfer fluid from one chamber to another, and (b) an actuator requiring no external setting of guide rods to limit any direction of movement against overpressure or spring load.

A further object of the invention is to provide an electro-hydraulic actuator which can achieve up to 360 degree rotation of its output shaft.

Another object of the invention is to provide an internally integrated "fail-safe" solenoid valve to effect rapid change in actuator position, returning the actuator to its initial position in the event of power failure.

A still further object of the invention is to provide an internally integrated positioning solenoid valve for a electro-hydraulic actuator which is preferably smaller than the primary solenoid valve for providing fine control of actuator operation to adjust the position of the actuator.

A still further object of the invention is to provide actuator having internal guide rods for guiding the movement of the piston/rack of the actuator to keep the piston/rack and pinion in contact and squarely aligned, as well as providing protection from nonlinear pressure distribution which could mechanically bind the actuator.

Other objects of this invention will be obvious from the following description and the claims appended thereto.

In accordance with the foregoing objects, an electrohydraulic actuator according to the invention comprises an actuator casing and a piston/rack means within the casing having walls reciprocating linearly to effect linear movements, the reciprocating walls defining a center chamber therebetween and two outside chambers inside the casing. An output shaft is in communication with said piston/rack means for driving a valve, the output shaft effecting rotational movements in response to the linear movements of said piston/rack means. Preferably, the piston/rack means is capable of transmitting enough linear movement so that the output shaft can rotate up to 360 degrees. A resilient return means is provided which engages the reciprocating walls of the piston/rack means and inner end walls of the casing, and biases the reciprocating walls of the piston/rack means to a closed position.

The actuator further includes a pumping means and preferably a check valve located at the outlet of the pumping means. A primary internal flow path is provided for transferring fluid from the pumping means to a first output port and into the center chamber, wherein the fluid causes the piston/rack means to expand in the casing and transmit linear motion of the piston/rack means to the output shaft.

A fail-safe solenoid valve system is further provided comprising a secondary internal flow path connecting to and extending from the primary internal flow path to a second outlet port opening into at least one of the outside chambers, and a normally closed solenoid valve in the secondary flow path preventing flow through the secondary flow path, wherein, upon loss of power to the actuator, the solenoid valve opens allowing the resilient return means to force fluid out of the center chamber, through the primary and secondary internal flow paths, and into at least one of the outside chambers, and to return the piston/rack means to a closed position, thereby rotating the output shaft in communication with a device to be turned.

In further aspects of the invention, the electro-hydraulic actuator comprises at least one internal guide rod for guiding the linear motion of the piston/rack means in the casing, wherein, preferably, at least one of the internal guide rods contain the first output port from the primary flow path and fluid flowing to and from the primary flow path to the center chamber flows through the internal guide rod and the first output port in said internal guide rod.

In another aspect of the invention, a positioning solenoid valve system is provided including a tertiary internal flow path connecting to and extending from said primary internal flow path to said second outlet port and a normally closed positioning solenoid valve in said tertiary flow path preventing flow through said tertiary flow path wherein, to partially close said actuator piston/rack, said positioning solenoid valve is opened by a positioning controller allowing said resilient return means to force fluid out of said center chamber, through said primary and tertiary internal flow paths, and into at least one of said outside chambers, and to move said piston/rack means to a partially closed position whereby said positioning controller closes said positioning solenoid valve. The positioning solenoid valve preferably has a smaller flow capacity than said fail-safe solenoid valve.

In a further aspect of the invention, one or more push rods are provided for monitoring the position of said piston/rack and a limit switch is provided for stopping pumping of the pumping means when the push rod indicates said piston/rack is fully open.

BRIEF DESCRIPTION OF THE DRAWINGS

FIG. 2*a* is a perspective cut away view of the hydraulic piston assembly of the actuator showing the position of the piston/rack when the actuator is pressurized.

FIG. 2*b* is a perspective cut away view of the hydraulic piston assembly of the actuator showing the position of the piston/rack when the actuator is unpressurized.

DESCRIPTION OF THE PREFERRED EMBODIMENTS

The invention will now be described with reference to the Figures.

Figure 1:
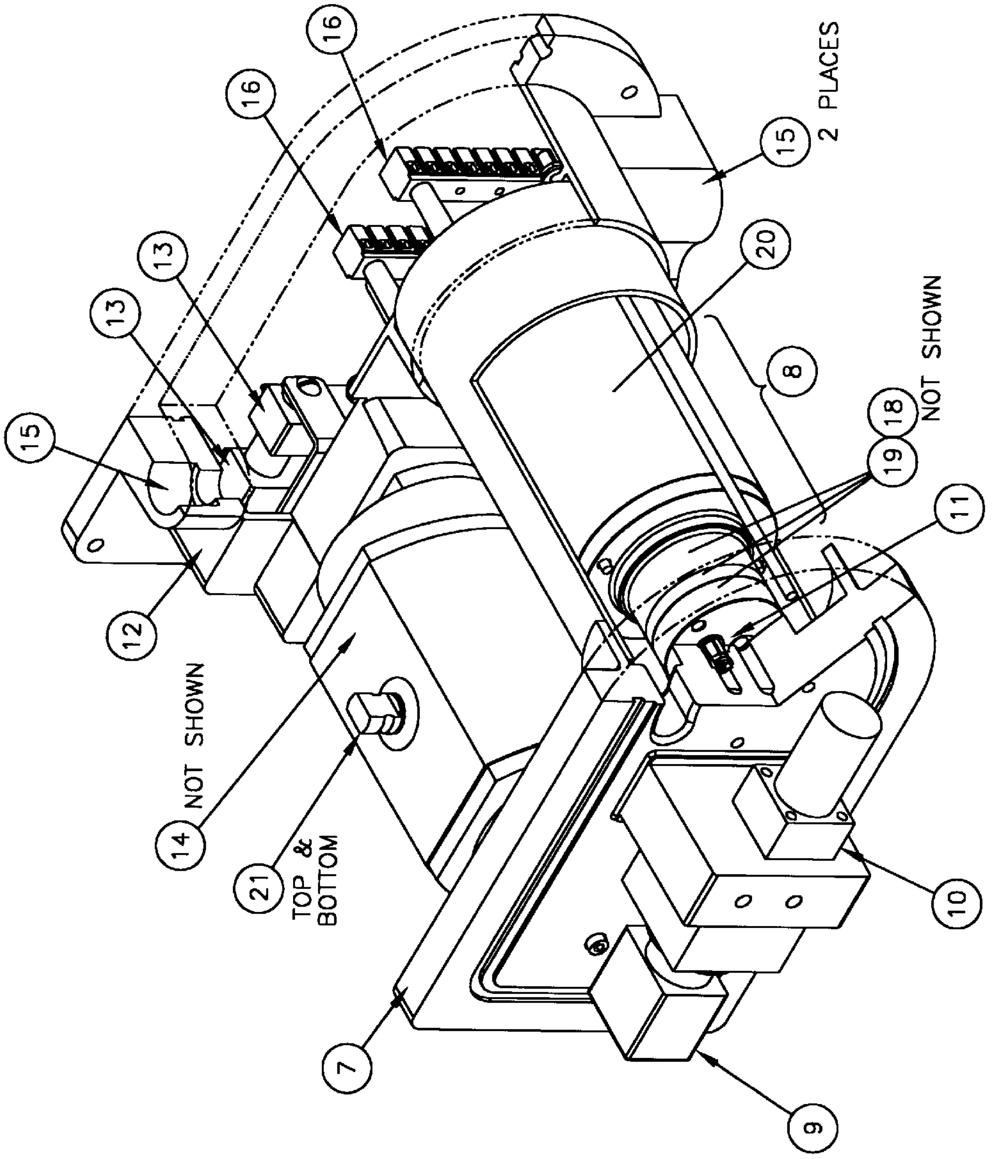
FIG. 1 is a perspective view of an electro-hydraulic actuator according to the present invention.

FIG. 1 shows a preferred embodiment of an electro-hydraulic actuator according to the present invention. The actuator has no external plumbing connections which are susceptible to freezing, breakage, leakage associated with tubing connections and hydraulic joints. The actuator is completely self-contained and uses internal cast flow paths to move fluid to and from the various operating components of the actuator. The actuator has no atmospheric vented reservoir and can be mounted in any orientation.

The actuator preferably comprises a pump and motor assembly 8 including a gerotor positive displacement pump element 18 (not shown), plates to house the gerotor 19 and a motor 20 close coupled to the gerotor 19 to turn the gerotor 19 and create pumping action. A gerotor positive displacement pump element advantageously provides faster operational speeds than hydraulic units using a spur gear or a diaphragm pump.

A pump end casing 7 provides a mount for the pump and motor assembly 8, solenoid valve 29 and optional solenoid valve 31, and also provides a mechanism for fluid transfer within the actuator including to and from solenoid valves 9 and 10 and the pump and motor assembly 8. The pump end casing preferably also includes a one-way check valve 11 to prevent back flow into the pump.

Figure 3:
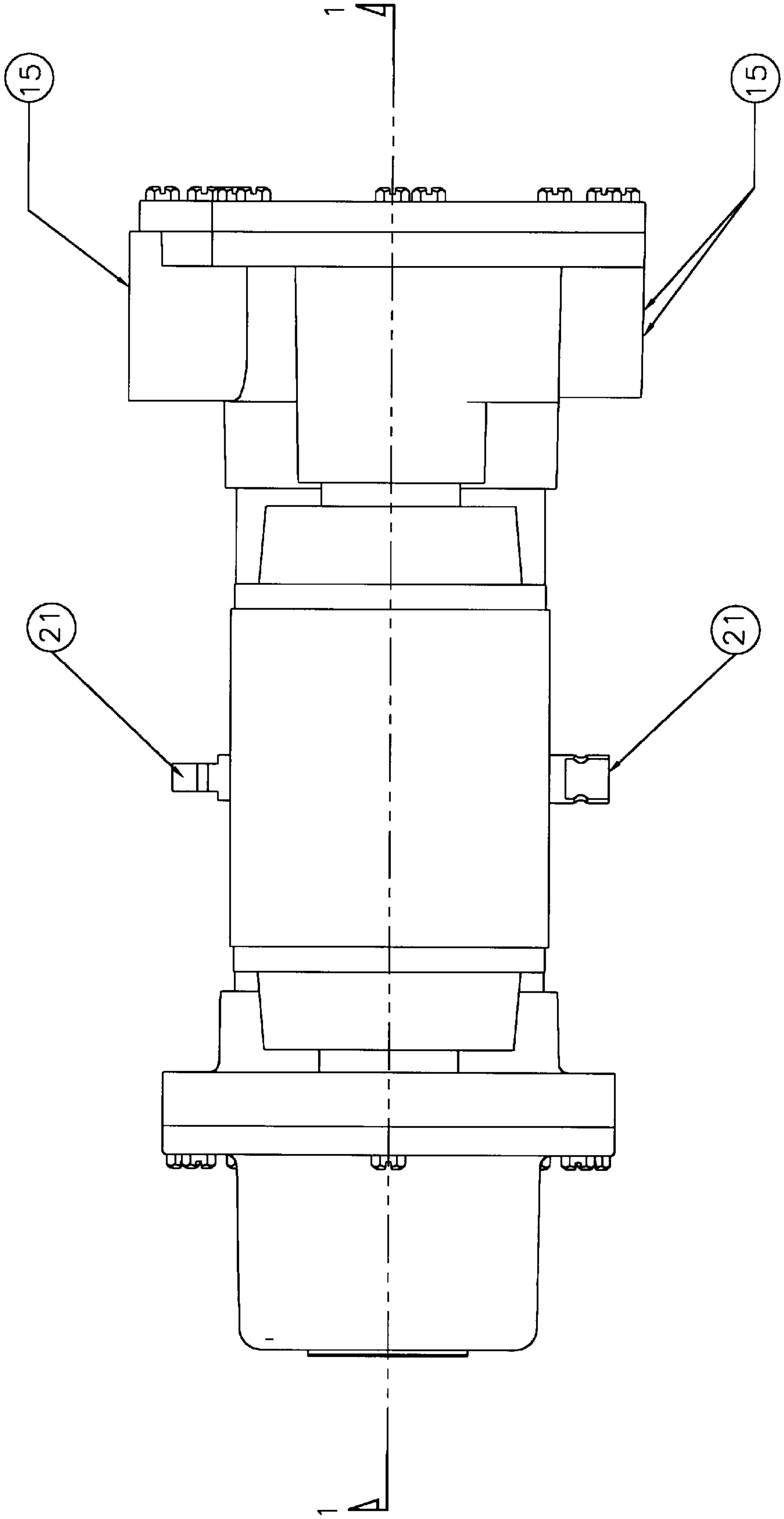
FIG. 3 is a side view of the casing of an actuator according to the present invention.
Figure 4:
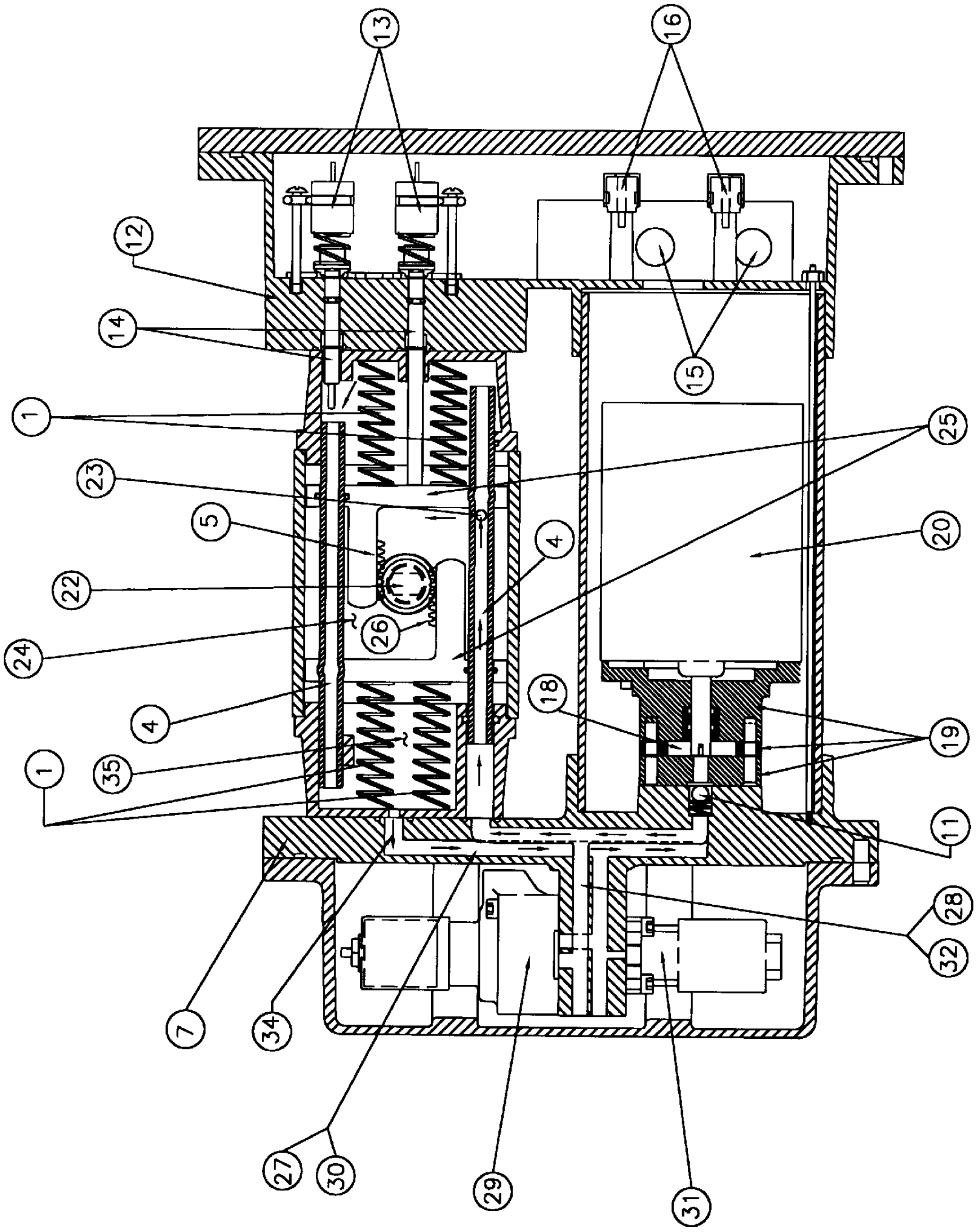
FIG. 4 is a sectional view of FIG. 3 taken at section line 1—1 and showing internal components of an actuator according to the present invention.

As shown in FIG. 4, the hydraulic piston assembly of the actuator preferably comprises piston return springs 1, piston/rack 5, internal guide rods 4, a splined output shaft 22, and output shaft connections 21 (see FIG. 3). As shown in FIGS. 2*a* and 2*b*, the output shaft connections 21 are connected to output pinion 6 and are concentrically surrounded by hydraulic pinion seals 2. Pinion 6 is connected to a device to be turned, such as a valve. However, the actuator of the present invention can also be used for operating dampers, louvers and other devices which require a rotarty motion to effect a change in operation.

The hydraulic piston assembly is operated by fluid pressure entering the assembly from the pump end casting 7 through output port 23 preferably located in one of the internal guide rods 4 and into center chamber 24 between piston/rack walls 25. As the pressure increases, the center chamber 24 fills with fluid and presses piston/rack walls 25 outward against the action of return springs 1. Internal guide rods 4 keep the piston/rack 5 square to the pinion 6 during movement. As piston/rack walls 25 move outward, teeth 26 on the piston/rack 5 engaging corresponding teeth on the output shaft 22 turn the output shaft 22 and pinion 6 (shown in FIG. 2*a*). The pinion 6 is connected to a valve (not shown) and the turning action of the pinion 6 is transmitted to a valve by any number of means known in the prior art.

A limit switch end casing 12 houses limit switches 13 and connecting push rods 14 which monitor the piston position and control the actuator when it reaches full stroke. When the actuator reaches its fully open position, connecting rods 14 are displaced toward the limit switch end casing 12 which activates the limit switches 13. The limit switches 13 then shuts down the pump and motor. No external gearing, cams, or rods are used. Conduit connections 15 and terminal strips 16 are also provided for wiring the motor, position control electronics, or for providing a drain port if desired.

The operation of the fail safe mechanism will now be discussed. In line check valve 11 is positioned at the outlet of pump and motor assembly 8 to prevent back flow of fluid into the pump and motor assembly 8 when not operating. See FIGS. 1, 4 and 5. As shown in the fluid flow schematic of FIG. 5, fluid is pumped from the check valve 11 through flow path 27 to the hydraulic piston assembly and through port 23 (see FIG. 4) in internal guide rod 4 to operate piston/rack 5 as discussed above with reference to FIG. 4.

Alternative flow path 28 leads to solenoid valve 29, the "fail-safe" solenoid valve (shown in a "closed" position).

In systems with only one solenoid valve, when the actuator is energized, solenoid valve 29 is closed, and hydraulic fluid flows only to the hydraulic piston assembly. If there is loss of power to the actuator, or the actuator is de-energized, solenoid valve 29 opens allowing the return springs 1 to force fluid to move out of the center chamber 24 and rotate pinion 6 to a "fail-safe" position. The fluid forced out of the center chamber 24 flows through paths 27 and 28 to path 30 (see FIG. 5), into the hydraulic piston assembly and through port 34 (see FIG. 4) into an outside chamber 35 as shown in FIG. 4.

Preferably, the electric-hydraulic actuators of the present invention have two solenoid valves which operate independently from one another. However, a person skilled in the art can readily apply the principles of the invention to actuators having three or more solenoid valves. As discussed above, solenoid valve 29 is used for "fail safe" operation. In the event of power failure, or power shut off to the actuator, solenoid valve 29 opens and allows the return springs 1 to force the actuator into a "fail-safe" position. Means for signaling the solenoid valve 29 to open upon power failure are well known in the art.

Figure 5:
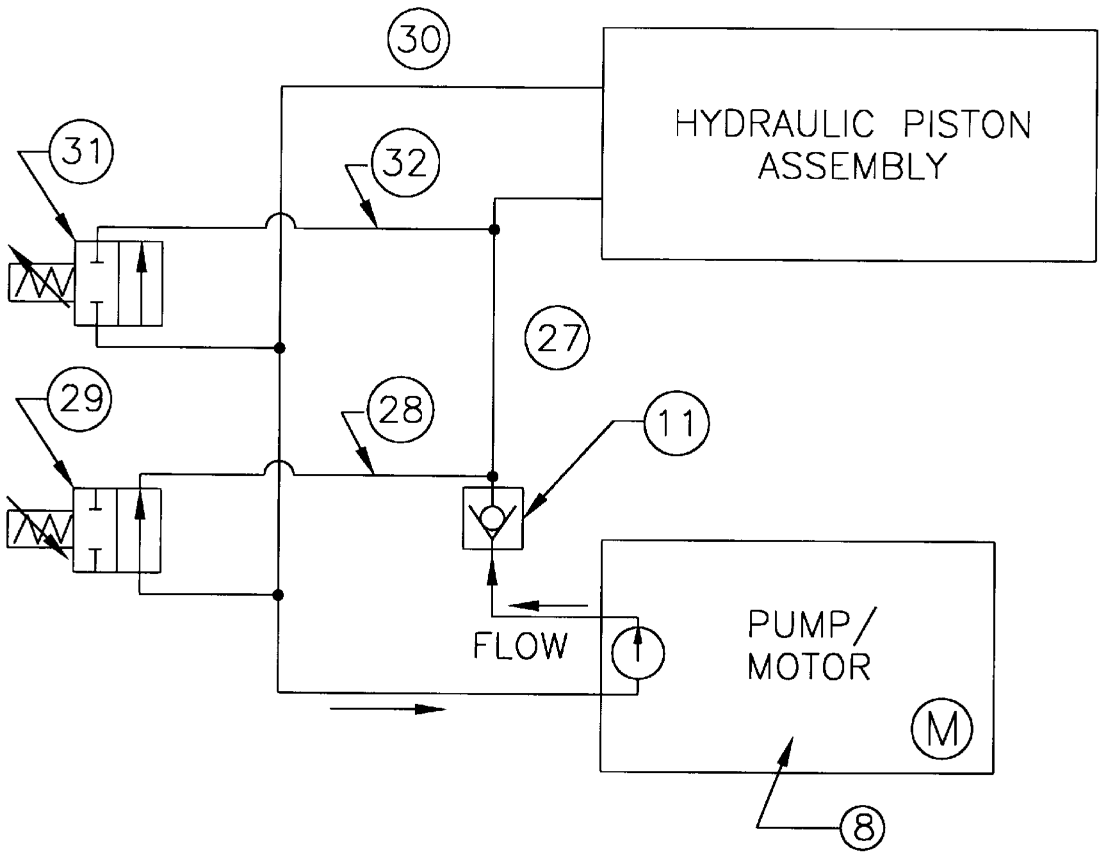
FIG. 5 shows a flow path schematic of the hydraulic fluid in internal casted flow paths of an actuator according to the present invention.

Positioning solenoid valve 31, as shown in FIG. 5, is connected to flow path 27 by flow path 32, on either side of where flow path 28 connects to flow path 27. Positioning solenoid valve 31 is normally closed and is used in conjunction with a positioning controller (not shown) mounted to the actuator for intermediate actuator positioning. Positioning solenoid valve 31 preferably has a smaller capacity than the "fail-safe" solenoid valve to allow for finer control of the speed and positioning of the actuator to avoid overshoot.

When power is applied to the unit, the positioning solenoid valve 31 and fail-safe solenoid valve 29 are closed and remain closed until some further change in the system. To open the actuator to an initial position not fully open, the controller limits the power to the motor to that necessary to open the actuator to the particular position for which the controller is set. The check valve 11 maintains the required fluid pressure to hold the actuator at the desired position. To further open the actuator to a different position, the motor is started and the controller provides increased power to the motor to push more fluid into the center chamber 24.

To partially close the actuator to a different position, the controller sends a signal to the positioning solenoid valve 31 to open the positioning solenoid valve 31 allowing the return springs 1 to force fluid to move out of the center chamber 24 through paths 27 and 32 to path 30 and through port 34 into the hydraulic piston assembly in an outside chamber 35, outside of the rack/piston walls 25. See FIGS. 4 and 5. Once the actuator has reached the desired position, the positioning solenoid valve 31 is closed to maintain the actuator in the desired position.

FIG. 4 shows a top view of the internal flow paths as they are preferably contained within the actuator casing, with flow path 27, containing check valve 11, being located directly above flow path 30 (see also FIG. 1), and flow paths 32 and 28 being located in the same vertical plane within the actuator casing.

The positioning controller can be any of a various types of market-available positioning devices capable of controlling at voltages compatible with motor and solenoid requirements of actuators using the invention. The voltage requirements of a particular actuator using the invention will vary depending on the size of power requirements of the valve and actuator.

The foregoing are but a few of the many ways in which the present invention may be embodied. The above embodiments are offered for purposes of illustration only and are not limiting. Accordingly, it is intended to protect all subject matter defined by the accompanying claims and equivalents thereof.

We claim:

1. An electro-hydraulic valve actuator comprising:

an actuator casing;

piston/rack means in said casing having walls reciprocating linearly to effect linear movements, said reciprocating walls defining a center chamber therebetween and two outside chambers inside said casing;

an output shaft in communication with said piston/rack means, said output shaft effecting rotational movements in response to the linear movements of said piston/rack means;

resilient return means in each of said two outside chambers engaging said reciprocating walls of said piston/rack means and inner end walls of said casing, said resilient return means biasing said reciprocating walls of the piston/rack means to a closed position;

pumping means;

a primary internal flow path for transferring fluid from said pumping means into said center chamber, introduction of fluid in said center chamber causing said piston/rack means to expand to transmit said linear movements to said output shaft; and a fail-safe solenoid valve system having a secondary internal flow path connecting to and extending from said primary internal flow path into at least one of said outside chambers, and a normally closed fail-safe solenoid valve in said secondary internal flow path preventing flow through said secondary internal flow path;

wherein, upon loss of power to said actuator, said fail-safe solenoid valve opens to thereby cause said resilient return means to force fluid out of said center chamber, through said primary and secondary internal flow paths, into at least one of said outside chambers, so that said piston/rack means is returned to a closed position for rotating said output shaft.

2. An electro-hydraulic actuator according to claim 1 further comprising at least one internal guide rod for guiding said linear movements of said piston/rack means in the casing.

3. An electro-hydraulic valve actuator according to claim 2 wherein at least one of said internal guide rods contains a first output port from said primary flow path; and wherein fluid flowing to and from said primary flow path to said center chamber flows through said at least one internal guide rod and said first output port in said internal guide rod.

4. An electro-hydraulic valve actuator according to claim 1 further comprising a positioning solenoid valve system, said positioning solenoid valve system including a tertiary internal flow path connecting to and extending from said primary internal flow path into at least one of said outside chambers and a normally closed positioning solenoid valve in said tertiary flow path preventing flow through said tertiary flow path;

wherein, to partially close said actuator piston/rack, said positioning solenoid valve is opened allowing said resilient return means to force fluid out of said center chamber, through said primary and tertiary internal flow paths, and into at least one of said outside chambers, and to move said piston/rack means to a partially closed position whereby said positioning solenoid valve may be closed.

5. An electro-hydraulic actuator according to claim 4 wherein said positioning solenoid valve has a smaller flow capacity than said fail-safe solenoid valve.

6. An electro-hydraulic valve actuator according to claim 1 wherein said piston/rack means is capable of effecting linear movements of sufficient extent to produce rotational movements of up to 360 degrees for said output shaft.

7. An electro-hydraulic actuator according to claim 1 wherein said pumping means comprises a gerotor positive displacement pump.

8. An electro-hydraulic valve actuator according to claim 1 further comprising a push rod for monitoring the position of said piston/rack means; and a limit switch for stopping pumping of said pumping means when said push rod indicates said piston/rack means is fully open.

9. An electro-hydraulic actuator according to claim 1 further comprising a check valve located at the outlet of the pumping means for preventing backflow into the pumping means.

10. An electro-hydraulic valve actuator according to claim 1 wherein said output shaft is adapted to drive a component selected from the group consisting of a valve, a damper or a louver.

11. An electro-hydraulic actuator according to claim 1 wherein said resilient return means comprises springs.

* * * * *